United States Patent [19]

Maruko et al.

[11] 3,964,874

[45] June 22, 1976

[54] CONTINUOUS REACTOR FOR VISCOUS MATERIALS

[75] Inventors: Morihisa Maruko; Chikao Oda; Eizi Nakashima, all of Kudamatsu, Japan

[73] Assignee: Hitachi, Ltd., Japan

[22] Filed: Mar. 30, 1973

[21] Appl. No.: 346,309

[30] Foreign Application Priority Data

Apr. 12, 1972  Japan............................ 47-36057

[52] U.S. Cl.............................. 23/285; 23/252 R; 159/6 WH; 259/6; 259/104; 259/182
[51] Int. Cl.²..................... B01J 10/00; B01F 7/02
[58] Field of Search............... 23/285, 252 R; 259/6, 259/104, 182; 159/6 WH

[56] References Cited
UNITED STATES PATENTS

| | | | |
|---|---|---|---|
| 2,726,852 | 12/1955 | Sommer | 259/6 |
| 3,285,582 | 11/1966 | Hübner | 259/104 |
| 3,377,139 | 4/1968 | MacGregor et al. | 23/285 |
| 3,419,250 | 12/1968 | Brennan | 259/6 |
| 3,440,019 | 4/1969 | Albrecht et al. | 23/285 |
| 3,498,754 | 3/1970 | Yamashita et al. | 23/285 |
| 3,498,762 | 3/1970 | Van Der Schee et al. | 23/285 |
| 3,617,225 | 11/1971 | Kuehne et al. | 23/285 |
| 3,728,083 | 4/1973 | Greenburg et al. | 23/285 |

Primary Examiner—Morris O. Wolk
Assistant Examiner—Dale Lovercheck
Attorney, Agent, or Firm—Craig & Antonelli

[57] ABSTRACT

A continuous reactor for viscous materials that give off volatile matter during operation has two rows of agitation rotors mounted staggeredly and with a phase angle of 90° to each other on a parallel pair of shafts. Each of the agitation rotors consists of a pair of annular brackets arranged symmetrically across the axis of one shaft in a figure eight pattern, and a pair of scraper plates attached edgewise to the free ends of the brackets, one for each, at right angles to the brackets and in parallel with the shaft. The shafts are spaced apart so that the rotors on each shaft can revolve with their free ends passing close by the other shaft as well as part of the surrounding wall of the casing.

11 Claims, 4 Drawing Figures

CONTINUOUS REACTOR FOR VISCOUS MATERIALS

This invention relates to a continuous reactor for the viscous materials that give off volatile matter, such as alcohol or water, in the course of condensation or polymerization, for example for the preparation of a high-molecular polymer through condensation of a monomer.

Generally, with a reactor handling a viscous material from which the volatile contents must be removed during the progress of the reaction, it is important that the reactor should enable the reactant fluid to have as much exposed surface area as possible, cause frequent surface renewal of the fluid, and provide little dead spaces for the flow.

Continuous reactors of conventional designs necessarily produce dead spaces, or the regions where the agitation effect by agitator blades is very little. This is typically illustrated in FIG. 4 which shows a multiple-disc reactor 11 accommodating a parallel pair of rotating shafts 12 and a plurality of discs 13 mounted on the two shafts in a staggered or partially overlapping relationship. In the arrangement shown, the distances between the discs and between the discs 13 and weirs 14 are relatively large and, as a result, dead spaces are formed in the regions (marked "X") where the discs 13 fail to achieve an adequate agitation effect. The polymer, when trapped in these spaces, will not undergo active surface renewal and its retention time in the reactor will be locally prolonged. These factors may combinedly lead to a product of inferior quality.

The present invention has for its object the attainment of an improved reaction efficiency with a reactor which enables the reactant to have a large exposed surface area and undergo effective surface renewal with a minimum of overall dead space in the vessel.

The above and other objects and features of the invention will become apparent from the following description taken in conjunction with the accompanying drawing, in which.

Figure 1:
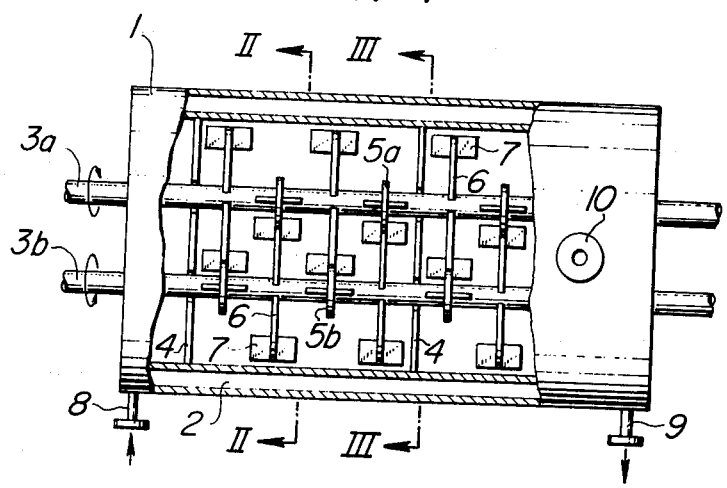
FIG. 1 is a plan view, partly in section, of a continuous reactor embodying the present invention.
Figure 2:
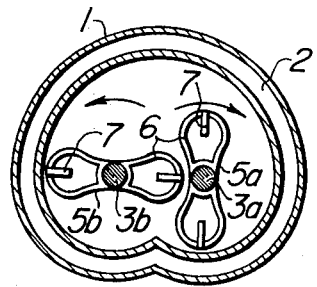
FIG. 2 is a cross sectional view taken on the line II—II of FIG. 1.
Figure 3:
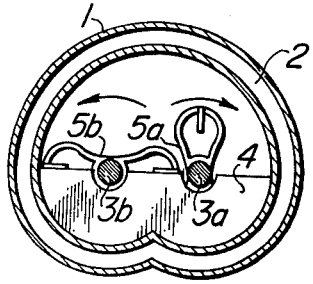
FIG. 3 is a cross sectional view taken on the line III—III of FIG. 1.
Figure 4:
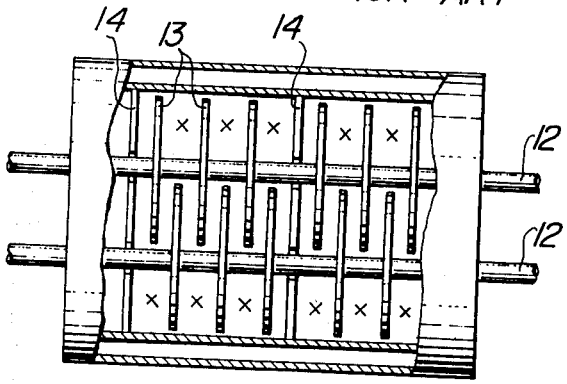
FIG. 4 is a plan view, partly in section of an ordinary continuous reactor.

Referring specifically to FIGS. 1 to 3, there is shown an embodiment of the invention as comprising a cylindrical casing 1 which is substantially horizontally installed and equipped with heater means 2, a pair of shafts 3a, 3b rotatably supported in parallel within the casing 1, a plurality of generally B-shaped weirs 4 which partition the lower half of the cylindrical hollow of the casing 1 into a plurality of chambers, and agitation rotors 5a, 5b secured, respectively, to the shafts 3a, 3b. Each of the agitation rotors consists of a pair of generally annular brackets 6 arranged symmetrically across the shaft axis in a figure eight pattern and a pair of scraper plates 7 each attached at one edge to the free ends of the brackets, one for each, with the other edge of each scraper plate being directed inwardly to the shaft, so that the plates are held at right angles to their brackets and in parallel with the shaft. Two rows of such agitation blades 5a, 5b are staggeredly mounted on the shafts with a phase angle of 90° to each other. The shafts 3a, 3b are spaced apart to enable the agitation rotors 5a, 5b thereon to revolve with their free ends passing close by the other shaft. The reactor is provided with an inlet nozzle 8, an outlet nozzle 9, and a vent nozzle 10.

Liquid to be treated is fed into the reactor through its inlet nozzle 8, heated by the heating means 2, and is led into the successive chambers beyond the weirs 4, while being subjected to the agitation and surface-renewal effect of the agitation rotors 5a, 5b, which in turn are driven by the shafts 3a, 3b running in the opposite directions, outwardly from the inside of the casing 1 as indicated by arrows. In this way the reaction of the liquid is promoted with the evaporation of its volatile content, and the viscosity of the liquid is gradually increased until the liquid is taken out of the outlet nozzle 9. The volatile matter evaporated in the reactor is discharged through the vent nozzle 10. The agitation rotors 5a, 5b, each of which consists of a pair of annular brackets 6 symmetrically disposed across the axis of the associated shaft and scraper plates 7 attached to the free ends of the brackets at right angles thereto, effectively agitate and mix the liquid as their one halves pass through the liquid in the lower half of the reactor. When the other halves of the agitation rotors run through the space above the liquid, each annular bracket 6 forms a thin film of the liquid stretched therein while, at the same time, each scraper plate 7 produces a combination of curtains rectangular in cross section formed of the liquid falling from all sides of the plate. This increases the overall surface area of the liquid under treatment and permits positive liquid surface renewal. Moreover, the agitation rotors 5a, 5b mounted on the shafts 3a, 3b in two rows with a phase angle of 90° to each other so that the free ends or the scraper plates 7 of either halves of the agitation rotors on each shaft can pass close to the other shaft, makes it possible to carry out the agitation and surface renewal of the liquid all the more effectively. Further, because the distance between the rows of agitation rotors 5a, 5b, or the distances between the scraper plates 7 and weirs 4, are very short, the scraper plates 7 can scrape off the liquid from the inner surface of the casing 1, from the both sides of the weirs 4, and from the surfaces of the rotating shafts 3a, 3b, thus minimizing the dead spaces that could otherwise be formed adjacent those surfaces.

As has been stated above, the reactor according to this invention can achieve a remarkably improved reaction efficiency by enabling the liquid being handled, or the reactant, to have a very large overall surface area and undergo effective surface renewal, with a minimum of overall dead space in the vessel during operation.

What is claimed is:

1. A continuous reactor comprising a substantially horizontal elongated container; a pair of parallel shafts rotatably mounted in said container; a plurality of figure-eight-shaped agitation rotors fixedly mounted on said shafts in pairs, one agitation rotor of each pair being fixed at the center thereof to one of said shafts, the other agitation rotor of each pair being fixedly attached at the center thereof to the other shaft, said one agitation rotor and said other agitation rotor being coplaner and normal to said shafts and arranged at a phase angle of 90° with respect to each other; and a plurality of scraper plates mounted in pairs to the ends of said agitation rotors remote from the centers thereof, said scraper plates being held at right angles to said agitation rotors and in parallel with said shafts, said shafts being spaced apart so as to allow the scraper plates attached to the agitation rotors on each shaft to pass in close proximity to the other shaft as said shafts rotate.

2. The reactor of claim 1, wherein viscous liquid material is maintained in the lower half of said container, and wherein said shaft means is arranged in said container so that the scraper plate attached to one end of at least one agitation rotor passes through the viscous liquid material while the scraper plate attached to the other end of said at least one agitation rotor passes through the space above the viscous liquid material.

3. the reactor of claim 1, wherein the container further comprises liquid inlet means at one end thereof, liquid outlet means of another end thereof, and vent nozzle means for discharging evaporated matter from the container.

4. The reactor of claim 1, wherein said scraper plates rotate through arcs as said shafts rotate, said arcs overlapping one another when viewed along a line between and parallel to the shafts.

5. The reactor of claim 1, wherein adjacent agitation rotors mounted on the same shaft are radially offset by about 90°.

6. The reactor of claim 1, wherein said scraper plates rotate through arcs as said shafts rotate, the portion of said elongated container horizontally below the plane containing said shafts being shaped so that said portion of the elongated container is spaced from the arcs travelled by said scraper plates by an essentially constant distance.

7. The reactor of claim 6, wherein the scraper plates, weirs, shafts and said container are closely arranged whereby during rotation the scraper plates scrape off the material from the container, weirs and shafts.

8. The reactor of claim 6, wherein adjacent agitation rotors mounted on the same shaft are radially offset by about 90°.

9. The reactor of claim 8 further comprising generally B-shaped weirs provided in the lower half of said housing, said weirs being spaced from each other to partition said container into a plurality of chambers, said chambers communicating with one another vertically above said weirs only.

10. The reactor of claim 6 further comprising generally B-shaped weirs provided in the lower half of said housing, said weirs being spaced from each other to partition said container into a plurality of chambers, said chambers communicating with one another vertically above said weirs only.

11. The reactor of claim 10, wherein the shafts are arranged near an upper end of each weir.

* * * * *